US010884378B2

(12) United States Patent
Park et al.

(10) Patent No.: US 10,884,378 B2
(45) Date of Patent: *Jan. 5, 2021

(54) APPARATUS AND METHOD FOR FORMING 3-DIMENSIONAL HOLOGRAPHIC IMAGE USING APERIODICALLY STRUCTURED OPTICAL ELEMENTS

(71) Applicant: Korea Advanced Institute of Science and Technology, Daejeon (KR)

(72) Inventors: YongKeun Park, Daejeon (KR); Jongchan Park, Daejeon (KR); KyeoReh Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 302 days.

This patent is subject to a terminal disclaimer.

(21) Appl. No.: 15/928,153

(22) Filed: Mar. 22, 2018

(65) Prior Publication Data

US 2018/0364641 A1  Dec. 20, 2018

(30) Foreign Application Priority Data

Jun. 20, 2017 (KR) .................. 10-2017-0078149
Nov. 16, 2017 (KR) .................. 10-2017-0152922

(51) Int. Cl.
*G03H 1/22* (2006.01)
*G03H 1/08* (2006.01)

(52) U.S. Cl.
CPC ......... *G03H 1/2294* (2013.01); *G03H 1/0808* (2013.01); *G03H 1/2205* (2013.01);
(Continued)

(58) Field of Classification Search
None
See application file for complete search history.

(56) References Cited

U.S. PATENT DOCUMENTS

| 9,354,605 B2 * | 5/2016 | Park ............... G03H 1/0808 |
| 2006/0050374 A1 * | 3/2006 | Slinger ............ G02F 1/133504 359/385 |

(Continued)

FOREIGN PATENT DOCUMENTS

| JP | 2015125331 | 7/2015 |
| JP | 2015125331 A * | 7/2015 |

(Continued)

OTHER PUBLICATIONS

Huang et al., "Ultrahigh-capacity non-periodic photon sieves operating in visible light", Nature Communications, May 5, 2015, pp. 1-7.

(Continued)

*Primary Examiner* — Derek S. Chapel
(74) *Attorney, Agent, or Firm* — Leber IP Law; Sarah M. Gates

(57) ABSTRACT

Disclosed herein are an apparatus and method for forming a 3D holographic image using non-periodically structured optical elements. The 3D holographic image apparatus includes a light source configured to radiate light, a spatial light modulator configured to modulate the light projected by the light source, and a non-periodic optical element configured to modulate incident light by refracting, diffracting or reflecting the direction of the incident light in a plurality of directions when the light modulated by the spatial light modulator is incident. A 3D holographic image may be formed based on the light modulated by the non-periodic optical element.

18 Claims, 7 Drawing Sheets

(52) U.S. Cl.
CPC . *G03H 2001/2239* (2013.01); *G03H 2210/30* (2013.01); *G03H 2226/02* (2013.01)

(56) References Cited

U.S. PATENT DOCUMENTS

| | | | |
|---|---|---|---|
| 2007/0188857 A1* | 8/2007 | Slinger | G02F 1/133504 359/385 |
| 2007/0188858 A1* | 8/2007 | Slinger | G02F 1/133504 359/385 |
| 2010/0103486 A1* | 4/2010 | Kroll | G03H 1/2294 359/9 |
| 2010/0214634 A1* | 8/2010 | Kroll | G02B 5/045 359/9 |
| 2015/0241843 A1* | 8/2015 | Park | G03H 1/0808 359/11 |
| 2017/0168453 A1* | 6/2017 | Onural | G03H 1/041 |
| 2020/0273388 A1* | 8/2020 | Seo | G09G 3/003 |

FOREIGN PATENT DOCUMENTS

| | | | | |
|---|---|---|---|---|
| WO | WO-2012026550 A1 | * | 3/2012 | ............ H04N 13/312 |
| WO | WO-2019009722 A2 | * | 1/2019 | ............ G03H 1/2205 |

OTHER PUBLICATIONS

Hahn et al., "Wide viewing angle dynamic holographic stereogram with a curved array of spatial light modulators", Optics Express, vol. 16, No. 16, Aug. 1, 2008, pp. 12372-12386.

Park et al. "Digital Holographic Display System with Large Screen Based on Viewing Window Movement for 3D Video Service," ETRI Journal, vol. 36, No. 2, Apr. 2014, pp. 232-241.

Yu et al., "Ultrahigh-definition dynamic 3D holographic display by active control of volume speckle fields," Nature Photonics, vol. 11, Mar. 2017, pp. 186-192.

* cited by examiner

APPARATUS AND METHOD FOR FORMING 3-DIMENSIONAL HOLOGRAPHIC IMAGE USING APERIODICALLY STRUCTURED OPTICAL ELEMENTS

CROSS REFERENCE TO RELATED APPLICATION

The present application claims the benefit of Korean Patent Application No. 10-2017-0078149 filed in the Korean Intellectual Property Office on Jun. 20, 2017 and Korean Patent Application No. 10-2017-0152922, filed in the Korean Intellectual Property Office on Nov. 16, 2017, the entire contents of which are incorporated herein by reference.

BACKGROUND OF THE INVENTION

1. Technical Field

The embodiments of the present invention relates to a three-dimensional (3D) holographic image technology for directly generating the wave front of light having three-dimensional (3D) image information.

2. Description of the Related Art

Unlike a technology for representing different image information in the eyes using a binocular disparity, a holographic technology restores light information from an actual object without any change. A 3D holographic image technology has been in the spotlight because a viewer can watch a 3D image including depth information without special glasses if the 3D holographic image technology is used.

The existing 3D holographic image technology modules light so that the light has 3D image information using a spatial light modulator. In this case, the size of a 3D image and the size of a viewing angle at which the 3D image can be watched are restricted by the number of optical modes capable of being controlled by the spatial light modulator. That is, a space-bandwidth product represented as the size of an image and the viewing angle is restricted by the number of pixels of the spatial light modulator.

Accordingly, there are problems in that the size of a 3D image to be implemented must be small if the 3D image having a large viewing angle is to be implemented using the existing 3D holographic image technology. The viewing angle is reduced if a 3D image having a large size is to be produced.

In order to overcome the problems, research is carried out on a technology for increasing the number of pixels capable of being controlled by the spatial light modulator. If the number of pixels is increased, however, technological and economical problems, such as increased computational complexity and an increased cost, are generated because of the increased amount of data to be processed.

In addition, a spatial multiplexing technology for reproducing a single 3D image using many spatial light modulators was suggested in Non-patent document [1] J. Hahn, H. Kim, Y. Lim, G. Park, and B. Lee, "Wide viewing angle dynamic holographic stereogram with a curved array of spatial light modulators," Opt. Express 16, 12372-12386 (2008) and a time multiplexing technology for reproducing temporally different images in various direction was suggested in Non-patent document [2] M. Park, B. G. Chae, H.-E. Kim, J. Hahn, H. Kim, C. H. Park, K. Moon, and J. Kim, "Digital holographic display system with large screen based on viewing window movement for 3D video service," ETRI journal 36, 232-241 (2014). However, both the spatial multiplexing and time multiplexing technologies require a large amount of data to be processed and also require a complicated physical driving system or optical system. A 3D holographic image can be implemented by a holographic display technology using a random scattering layer, which was suggested in Non-patent document [3] H. Yu, K. Lee, J. Park, and Y. Park, "Ultrahigh-definition dynamic 3D holographic display by active control of volume speckle fields," Nature Photonics 11, 186-192 (2017). If the random scattering layer is used, however, a very long time is required to precisely measure a transmission matrix and a computation load is huge.

Accordingly, there is a need for a hologram image technology which is not random and in which the size and viewing angle of a 3D image (i.e., desired 3D image) to be implemented have been improved/extended.

PRIOR ART DOCUMENT

Non-Patent Document

[1] J. Hahn, H. Kim, Y. Lim, G. Park, and B. Lee, "Wide viewing angle dynamic holographic stereogram with a curved array of spatial light modulators," Opt. Express 16, 12372-12386 (2008).
[2] M. Park, B. G. Chae, H.-E. Kim, J. Hahn, H. Kim, C. H. Park, K. Moon, and J. Kim, "Digital holographic display system with large screen based on viewing window movement for 3D video service," ETRI journal 36, 232-241 (2014).
[3] H. Yu, K. Lee, J. Park, and Y. Park, "Ultrahigh-definition dynamic 3D holographic display by active control of volume speckle fields," Nature Photonics 11, 186-192 (2017).

SUMMARY OF THE INVENTION

Embodiments of the present invention are directed to forming a 3D hologram image having a large viewing angle (e.g., a viewing angle of the number of pixels or more which may be represented by a spatial light modulator) within a wide space using a spatial light modulator.

a 3D holographic image apparatus includes a light source configured to radiate light, a spatial light modulator configured to modulate the light projected by the light source, and a non-periodic optical element configured to modulate incident light by refracting, diffracting or reflecting the direction of the incident light in a plurality of directions when the light modulated by the spatial light modulator is incident. A 3D holographic image may be formed based on the light modulated by the non-periodic optical element.

In accordance with one aspect, the formed 3D holographic image may include a 3D image having a greater space-bandwidth product than a space-bandwidth product corresponding to the number of pixels of the spatial light modulator.

In accordance with another aspect, the 3D holographic image apparatus may further include a computation unit configured to compute the incident pattern of the spatial light modulator based on image information of the 3D holographic image to be formed and the optical characteristics of the non-periodic optical element.

In accordance with yet another aspect, the computation unit may compute the incident pattern of the spatial light modulator based on a linear response function algorithm or an iterative algorithm.

In accordance with yet another aspect, the spatial light modulator may modulate the wave front or pattern of the light projected by the light source so that the light projected by the light source becomes the incident pattern of the spatial light modulator.

In accordance with yet another aspect, the non-periodic optical element may form the 3D holographic image having a desired wave front or pattern by transmitting light modulated to have a pattern corresponding to the incident pattern of the spatial light modulator.

In accordance with yet another aspect, the non-periodic optical element may include at least one of a pinhole array in which pinholes have been arranged in a predefined non-periodical way, a microlens array, a prism array, a diffractive optical element and a holographic optical element.

In accordance with yet another aspect, the non-periodic optical element may expand the size and field of view of an image corresponding to the light modulated by the spatial light modulator.

In accordance with yet another aspect, the non-periodic optical elements and pixels of the spatial light modulator may be configured to correspond to each other in a one-to-one manner.

In accordance with yet another aspect, the non-periodic optical element may expand a space-bandwidth product represented by the spatial light modulator by increasing a number of addressable optical modes corresponding to the number of pixels of the spatial light modulator.

A 3D holographic image method includes the steps of modulating light projected from a light source to a spatial light modulator and making incident the modulated light on a non-periodic optical element and modulating the incident light by refracting, diffracting or reflecting the direction of the incident light in a plurality of directions. A 3D holographic image may be formed based on the light modulated by the non-periodic optical element.

In accordance with one aspect, the formed 3D holographic image may include a 3D image having a greater space-bandwidth product than a space-bandwidth product corresponding to the number of pixels of the spatial light modulator.

In accordance with another aspect, the 3D holographic image method may further include the step of computing the incident pattern of the spatial light modulator based on image information of the 3D holographic image to be formed and the optical characteristics of the non-periodic optical element.

In accordance with yet another aspect, wherein the step of computing the incident pattern may include computing the incident pattern of the spatial light modulator based on a linear response function algorithm or an iterative algorithm.

In accordance with yet another aspect, the step of modulating the light projected onto the spatial light modulator may include modulating the wave front or pattern of the light projected by the light source so that the light projected by the light source becomes the incident pattern of the spatial light modulator.

In accordance with yet another aspect, the step of modulating the incident light may include forming the 3D holographic image having a desired wave front or pattern by transmitting light modulated to have a pattern corresponding to the incident pattern of the spatial light modulator.

In accordance with yet another aspect, the non-periodic optical element may include at least one of a pinhole array in which pinholes have been arranged in a predefined non-periodical way, a microlens array, a prism array, a diffractive optical element and a holographic optical element.

In accordance with yet another aspect, the step of modulating the incident light may include modulating the incident light by expanding a size and field of view of an image corresponding to the light modulated by the spatial light modulator.

In accordance with yet another aspect, the non-periodic optical elements and pixels of the spatial light modulator may be configured to correspond to each other in a one-to-one manner.

In accordance with yet another aspect, the step of modulating the incident light may include modulating the incident light by increasing a number of addressable optical modes corresponding to the number of pixels of the spatial light modulator so that a space bandwidth represented by the spatial light modulator is expanded.

DETAILED DESCRIPTION

Hereinafter, embodiments of the present invention are described in detail with reference to the accompanying drawings.

The present embodiments relate to a technology for forming a 3D hologram image having a large field of view and a large size within a wide space using a spatial light modulator and a non-periodic optical element. More specifically, the present embodiments relate to a technology for increasing a space bandwidth corresponding to the number of pixels of a spatial light modulator using the non-periodic optical element.

In the present embodiments, the "non-periodic optical element" may refer to an optical element in which optical elements are non-periodically arranged although they are not random and whose structure is previously known. For example, the non-periodic optical element may include at least one of a pinhole array in which pinholes have been arranged in a predefined and irregular manner, a microlens array, a prism array, a diffractive optical element and a holographic optical element. If the pinhole array or the microlens array is used as the non-periodic optical element, a 3D holographic image apparatus forming a 3D holographic image may be implemented in a flat panel 3D display form.

In the present embodiments, a "field of view (FOV)" may mean that the size of a region that may be monitored once by a telescope, a camera or an optical sensor is expressed using an angle.

In the present embodiments a "spatial light modulator" is an optical device for modulating the wave front or pattern of incident light, and may include at least one of a wave front modulator, a deformable mirror, a digital micromirror device, photorefractive materials and a holographic film.

Figure 1:
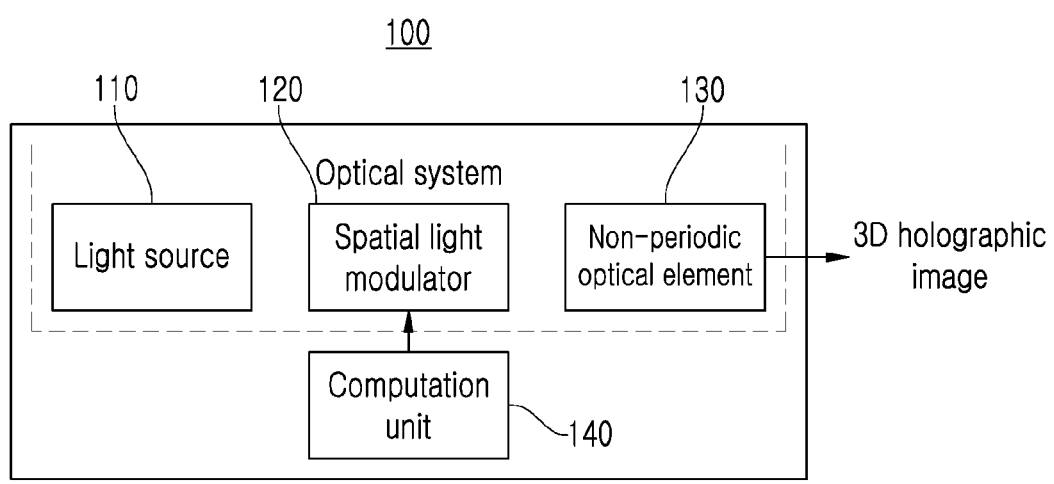
FIG. 1 is a block diagram showing the internal configuration of a 3D holographic image apparatus according to an embodiment of the present invention.
Figure 2:
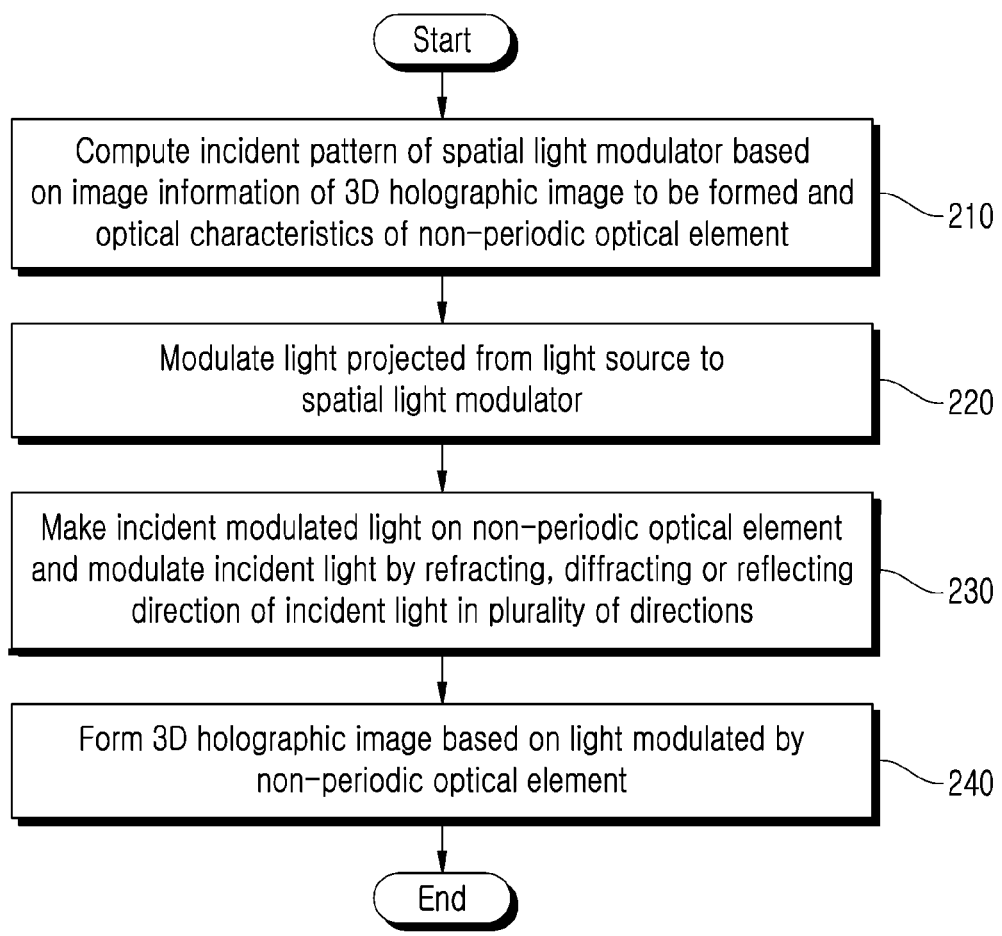
FIG. 2 is a flowchart showing a 3D holographic image method according to an embodiment of the present invention.

FIG. 1 is a block diagram showing the internal configuration of a 3D holographic image apparatus according to an embodiment of the present invention. FIG. 2 is a flowchart showing a 3D holographic image method according to an embodiment of the present invention.

Referring to FIG. 1, the 3D holographic image apparatus 100 may include a light source 110, a spatial light modulator 120, a non-periodic optical element 130 and a computation unit 140. In this case, the light source 110, the spatial light modulator 120 and the non-periodic optical element 130 correspond to the optical system of the 3D holographic image apparatus 100. A detailed structure of the optical system is described later with reference to FIGS. 5 to 7.

The steps 210 to 240 of FIG. 2 may be performed by the elements (e.g., the light source 110, the spatial light modulator 120, the non-periodic optical element 130 and the computation unit 140) of the 3D holographic image apparatus 100 of FIG. 1.

At step 210, the computation unit 140 may compute the incident pattern of the spatial light modulator 120 based on image information of a 3D holographic image to be formed and the optical characteristics of the non-periodic optical element 130.

For example, the computation unit 140 may receive 3D holographic image information to be implemented. Furthermore, the computation unit 140 may compute the incident pattern of the spatial light modulator 120 based on the received image information and the optical characteristics of the optical element 130. For example, the computation unit 140 may compute the incident pattern of the spatial light modulator 120 by applying the received image information and the optical characteristics of the optical element 130 to a linear response function algorithm or an iterative algorithm.

Figure 4:
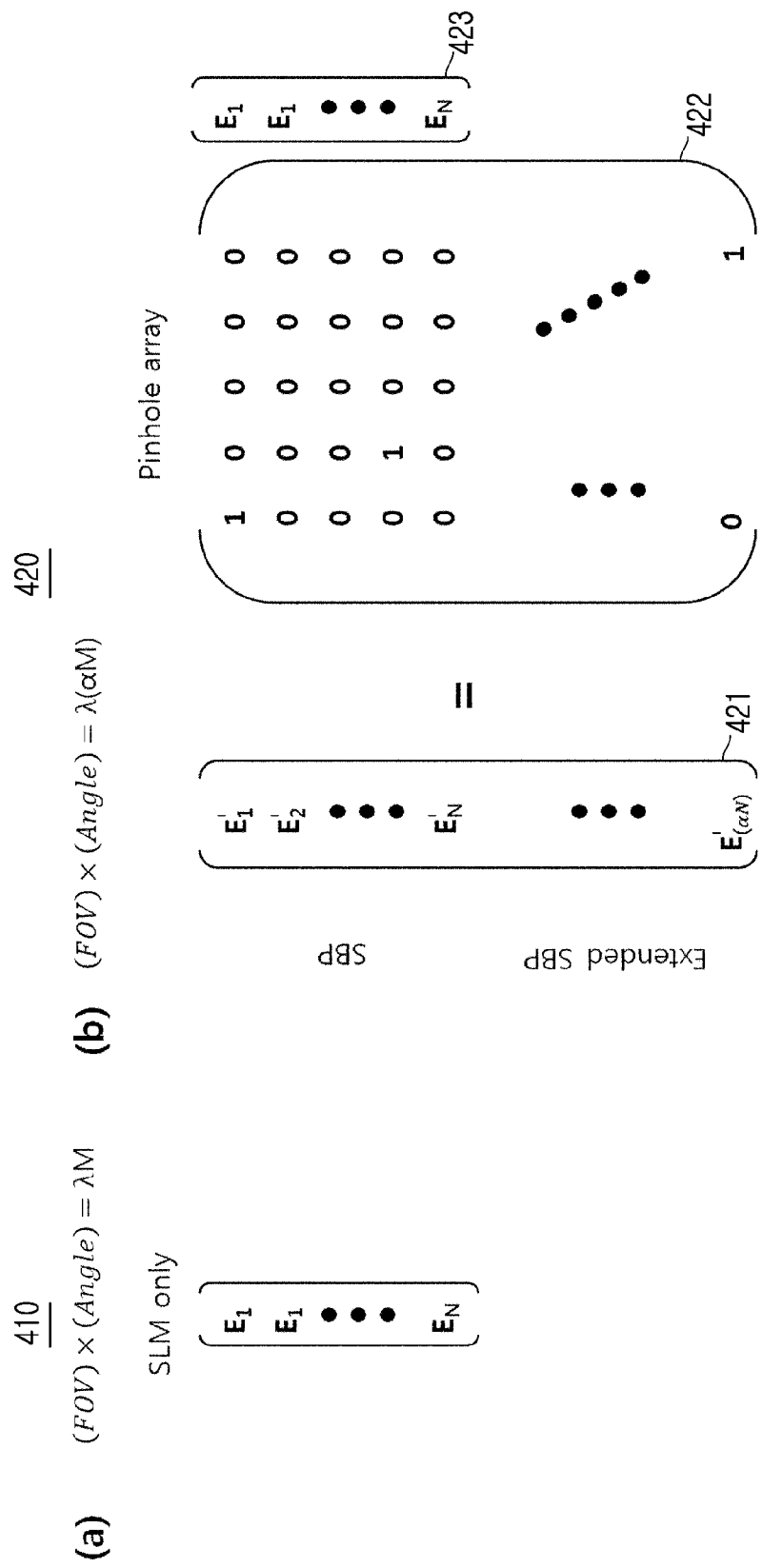
FIG. 4 is a diagram provided to describe an operation of increasing the optical mode of the spatial light modulator according to an embodiment of the present invention.

For example, referring to FIG. 4, the incident pattern 423 (i.e., incident optical pattern) of the spatial light modulator 120 may be computed based on 3D holographic image information 421 and the optical characteristics 422 of the optical element 130. In other words, electromagnetic waves (i.e., image information) having N optical modes $E_1, \ldots, E_N$ may pass through the pinhole array, and may be linearly transformed into electromagnetic waves (i.e., image information) having aN optical modes $E_1', \ldots, E_{aN}'$.

For example, if the iterative algorithm is used, a linear transformation operator T{ }, a propagator P{ }, a desired holographic image $I_O$ and an initial estimation pattern E may be set as input parameters, and an optimal incident pattern E may be set as an output parameter. The optimal incident pattern E' may be obtained by applying the iterative algorithm based on the initial estimation pattern E. Specifically, linear transform may be performed on a previous iterative cycle E' or the initial estimation pattern E through a non-periodically patterned optical element (i.e., the linear transformation operator) T{ } (S1). After the linear transform, the propagation P{ } for the image space normalization of strength/intensity pattern of a holographic image may be performed (S2). In this case, a strength/intensity profile may be updated by comparing the holographic image with a desired holographic image based on a holographic image constraint (S3). Accordingly, back propagation from an image space to $P^{-1}\{\ \}$, that is, the non-periodically patterned optical element, may be performed (S4). Next, linear (reverse) optical transformation may be performed by $T^{-1}\{\ \}$ that is the non-periodically patterned optical element (S5). In this case, a phase pattern may be updated based on the incident pattern constraint (S6). As described above, the optimal incident pattern E' (i.e., incident pattern) may be computed by repeatedly performing the processes (i.e., S1 to S6) of updating the phase pattern by applying T{ }, P{ }, the holographic image constraint conditions, $P^{-1}\{\ \}$, $T^{-1}\{\ \}$ and the incident pattern constraint conditions from the initial estimation pattern E.

At step 220, the spatial light modulator 120 may modulate light projected from the light source 110 to the spatial light modulator 120.

For example, the spatial light modulator 120 may modulate the wave front or pattern of the light incident thereto so that the light projected by the light source 110 becomes the incident pattern of the spatial light modulator 120 computed by the computation unit 140. In this case, the light source 110 includes a laser for radiating a laser beam. The spatial light modulator 120 is an optical device for modulating the wave front or pattern of incident light, and may include at least one of a wave front modulator, a deformable mirror, a digital micromirror device, photorefractive materials and a holographic film.

At step 230, the light modulated by the spatial light modulator 120 may be incident on the non-periodic optical element 130. The non-periodic optical element 130 may modulate the incident light by refracting, diffracting or reflecting the direction of the incident light from the spatial light modulator 120 in a plurality of directions (i.e., various directions). That is, the wave front or pattern of the light modulated by the spatial light modulator 120 may be modulated again by the non-periodic optical element 130.

For example, the non-periodic optical element 130 may refract, diffract or reflect the direction of the light incident on predefined and non-periodically arrayed elements (e.g., pinholes, a microlens, a diffractive element and a holographic element) in various directions. Accordingly, a 3D holographic image may be formed based on the light that has passed through the non-periodic optical element 130. In this case, the size and field of view of the formed 3D holographic image may not be restricted. In other words, the field of view can be extended to a field of view capable of being represented in the number of pixels greater than the number of pixels of the spatial light modulator 120 used to represent the field of view, and the size of a 3D holographic image that is implemented can also be extended relatively greatly.

When the optical characteristics of the spatial light modulator 120 are determined, the size and field of view of a 3D holographic image that may be produced (i.e., formed) are limited to specific values or less because the space bandwidth of the 3D holographic image is limited to the number of pixels of the spatial light modulator 120. However, the size and field of view of a 3D holographic image to be implemented can be extended by increasing the optical mode of the spatial light modulator 120 using the non-periodic optical element 130.

At step 240, a 3D holographic image to be formed may be formed based on the light modulated by the non-periodic optical element 130. In this case, the formed 3D holographic image may correspond to a 3D image having a space bandwidth greater than a space bandwidth corresponding to the number of pixels of the spatial light modulator 120.

For example, light of a pattern different over time may be input and modulated by the spatial light modulator 120. The modulated light is modulated by the non-periodic optical element 130 once more and output, thereby being capable of forming a moving holographic image.

Figure 3:
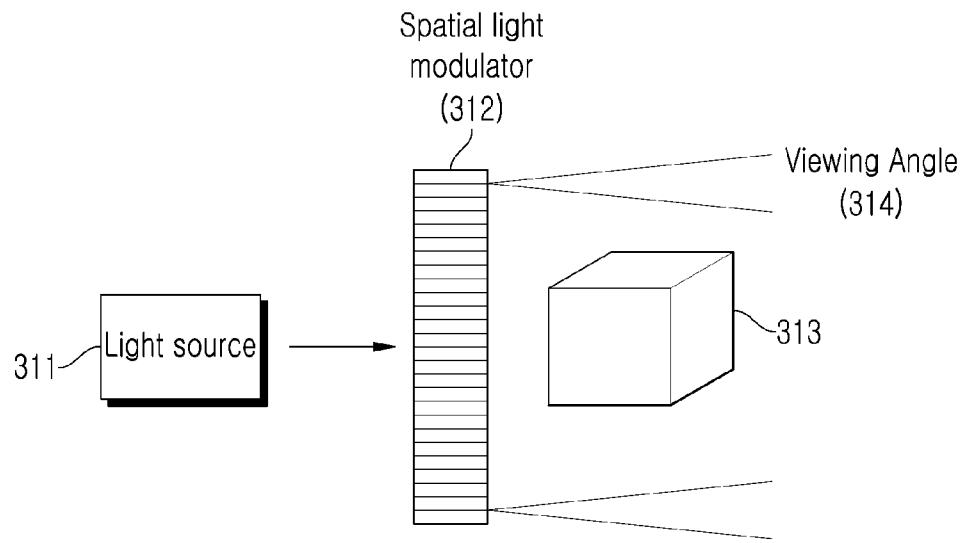
FIG. 3 is a diagram showing the structure of an optical system including a spatial light modulator and optical elements according to an embodiment of the present invention.
Figure 3:
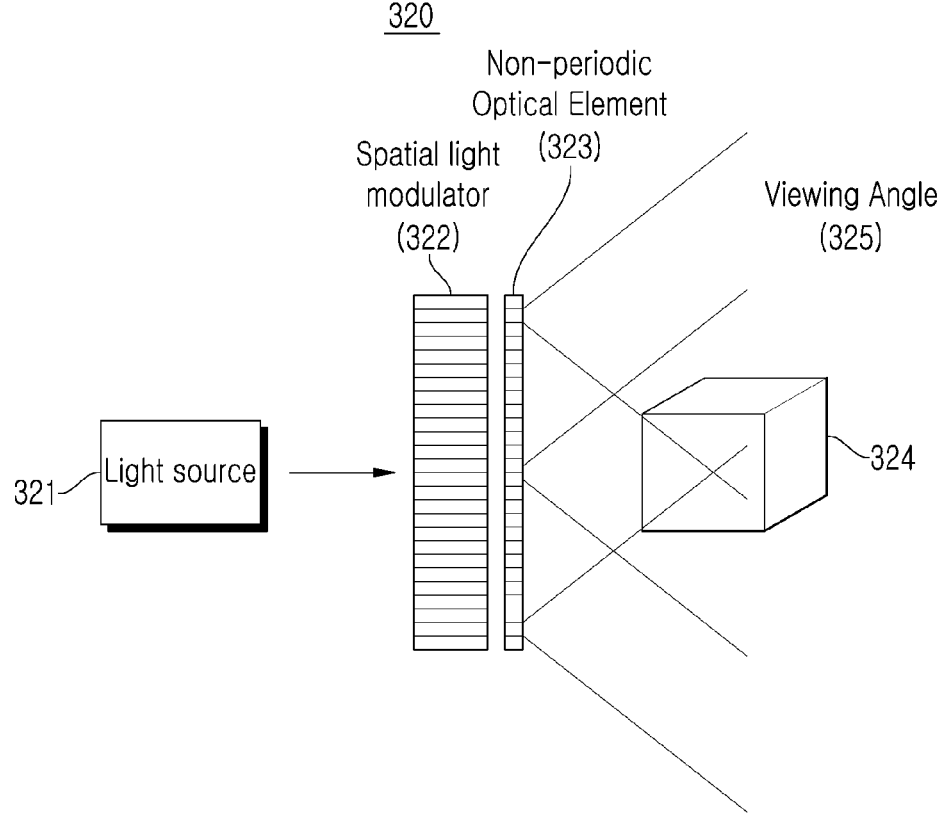

FIG. 3 is a diagram showing the structure of the optical system including the spatial light modulator and the optical elements according to an embodiment of the present invention.

Referring to FIG. 3, if a 3D holographic image 313 is formed using only a spatial light modulator 312 as in an optical system 310, light incident from a light source 311 to the spatial light modulator 312 may be modulated to form the 3D holographic image 313. In this case, it may be seen that the size and field of view of the 3D holographic image 313 and viewing angle 314 are limited to specific values or less because the space bandwidth of the 3D holographic image is limited to the number of pixels of the spatial light modulator 312.

If a 3D holographic image 324 is formed using a spatial light modulator 322 and a non-periodic optical element 323 as in an optical system 320, light incident from a light source 321 to the spatial light modulator 322 may be modulated and may be incident on the non-periodic optical element 323 and modulated once more to form the 3D holographic image 324. That is, the light incident from the non-periodic optical element 323 to the spatial light modulator 322 is diffracted, reflected or refracted in various directions. Accordingly, compared to the case where only the single spatial light modulator 312 is used, a field of view (or viewing angle) 325 can be relatively expanded and the 3D holographic image 324 having an extended size can be formed. In this case, the elements non-periodically arranged in the non-periodic optical element 323 and the pixels of the spatial light modulator 322 may be disposed to correspond to each other in a one-to-one manner.

For example, if the non-periodic optical element 323 is a pinhole array in which a plurality of pinholes has been non-periodically arranged, the pinholes and the pixels of the spatial light modulator 323 may be disposed to correspond to each other in a one-to-one manner.

FIG. 4 is a diagram provided to describe an operation of increasing the optical mode of the spatial light modulator according to an embodiment of the present invention.

Referring to FIG. 4, a space bandwidth may be represented by the product of the size and field of view of an image. That is, the space bandwidth may be represented by the product of the number of pixels N of a spatial light modulator related to the size of an image and a wavelength $\lambda$ related to a field of view. In FIG. 4, M may indicate the number of pixels, and SBP may denote a space-bandwidth product. Furthermore, in FIG. 4, M may correspond to N in the matrix equations 410 and 420 of FIG. 4. FOV may denote the size of an image, and the field of view may denote the field of view.

Referring to 410, if a 3D holographic image is implemented using only a spatial light modulator (e.g., SLM), the space bandwidth of the 3D image capable of being represented in the spatial light modulator 120 may be computed as the number of pixels N of the spatial light modulator and a wavelength $\lambda$. In this case, if the non-periodic optical element (e.g., pinhole array) is used as in 420, a space bandwidth corresponding to the number of pixels of the spatial light modulator 120 can be increased by a times. In this case, 420 indicates that how the holographic image (i.e., electromagnetic waves) is transformed into a matrix. Referring to 420, electromagnetic waves (i.e., image information) having N optical modes $E_1, \ldots, E_N$ may pass through the pinhole array, and may be linearly transformed into electromagnetic waves (i.e., image information) having aN optical modes $E_1', \ldots, E_{aN}'$. Furthermore, the $\alpha$ times may be determined by the shape and size of the pinholes. The number of pinholes is N identical with the number of pixels, and the pixels may correspond to the pinholes in a one-to-one manner.

For example, referring to 420, electromagnetic waves output from the N optical modes through the non-periodically/aperiodically arranged pinhole array (i.e., electromagnetic waves corresponding to the number of pixels N of the spatial light modulator 120) can be increased by the $\alpha$ times. Accordingly, the space bandwidth of the 3D holographic image that may be represented using the spatial light modulator 120 may be increased from $N\lambda$ to $\alpha N\lambda$. As described above, since the 3D holographic image is formed in the space bandwidth increased to $\alpha N\lambda$, display having an image having a relatively large field of view and size compared to the case where only the single spatial light modulator 120 is used can be made possible.

In this case, in order to transform the N optical modes into the $\alpha$N optical modes using the non-periodic optical element 130, optical mode transformation may have incoherence. If optical mode transformation has incoherence, a 3D holographic image (i.e., arbitrary 3D image) may be formed. For example, in order for the optical mode transformation to have incoherence, random transformation may be used. That is, in increasing a space bandwidth that may be represented by a single spatial light modulator using the single spatial light modulator and a non-periodic optical element, optical transformation, such as random transformation, other than the existing multiplexing method may be performed. The single spatial light modulator can increase an optical mode through such optical transformation. As a result, a 3D holographic image having the increased optical mode (i.e., space bandwidth) can be formed. Furthermore, complexity and a cost according to an implementation can be reduced because the multiplexing method requiring a complicated driving system is not used.

In other words, if a plurality of spatial light modulators is spatially put together (i.e., pace domain multiplexing) or a single spatial light modulator operating at high speed is temporally put together through a physical driving system (i.e., time domain multiplexing), the size of a display for playing back a 3D holographic image is physically increased, the hardware configuration of the display is complicated, and a computational load may be greatly increased because more optical modes must be driven in the spatial light modulator at the same time. In this case, the implementation complexity and physical size of the display and a computational load can be reduced by increasing a space bandwidth (i.e., optical mode) that may be represented in the single spatial light modulator without a physical driving system through optical transformation using the non-periodic optical element other than the multiplexing method. Furthermore, since the physical driving system is not used, a space bandwidth that may be represented in the single spatial light modulator can be increased several tens of thousands of times or more.

Figure 5:
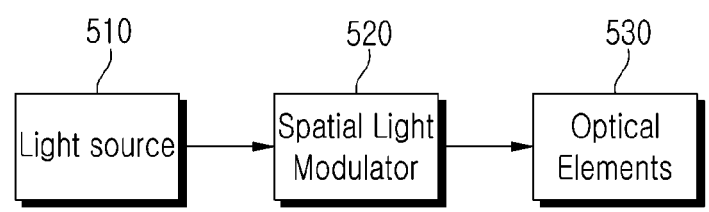
FIG. 5 is a diagram showing the structure of a transmission type optical system according to an embodiment of the present invention.
Figure 6:
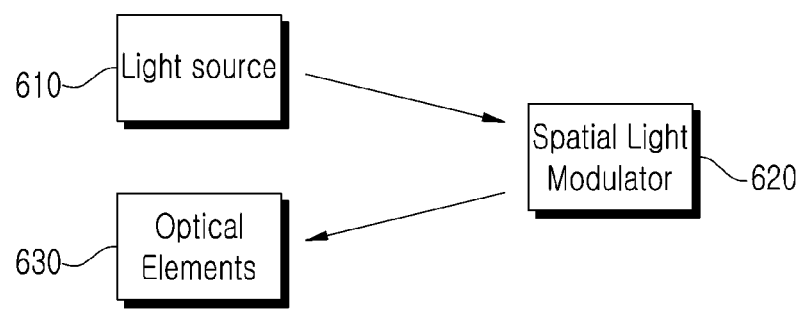
FIG. 6 is a diagram showing the structure of a reflection type optical system according to an embodiment of the present invention.
Figure 7:
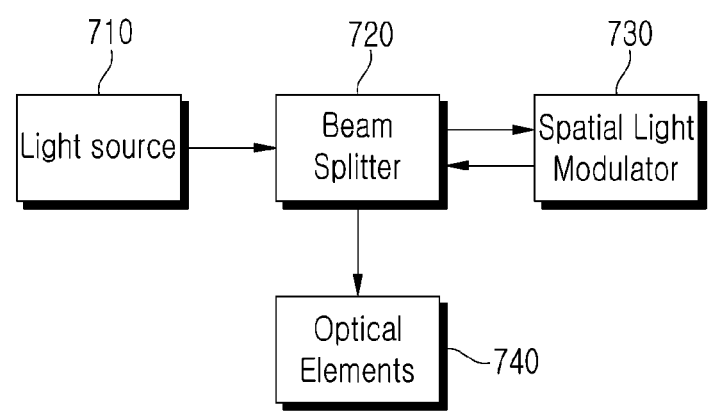
FIG. 7 is a diagram showing the structure of a reflection type optical system using a beam splitter according to an embodiment of the present invention.

FIG. 5 is a diagram showing the structure of a transmission type optical system according to an embodiment of the present invention, and FIGS. 6 and 7 are diagrams showing the structure of a reflection type optical system according to an embodiment of the present invention.

Referring to FIG. 5, if the optical system is designed in the transmission type, a spatial light modulator 520 may modulate light incident from a light source 510 based on the computed incident pattern of the spatial light modulator 520. Accordingly, optical elements 530 may be implemented to transmit the modulated light. For example, elements, such as pinholes disposed in the optical elements 530, and the pixels of the spatial light modulator 520 may be implemented to correspond to each other in a one-to-one manner.

If an optical system is implemented in the transmission type as in FIG. 5, it may be implemented in a form suitable for a mobile display because a 3D display can be implemented in a thin display form. For example, a 3D display implementation may be made possible by only attaching a thin pinhole array to a commercial LCD display. In this case, in the case of the common thin LCD, a fill factor occupied by pixels to the total area may affect holographic image quality because it is relatively low. Accordingly, an optical system may be implemented in various forms as in FIGS. 6 and 7 in addition to the transmission type.

Referring to FIG. 6, a spatial light modulator 620 may reflect modulated light toward optical elements 630.

Referring to FIG. 6, if the optical system is implemented in the reflection type, a reflection type display whose fill factor occupied by pixels to the total area is relatively high (e.g., >96%) may be used. A very large display can be easily implemented because several display images can be incident on a single large non-periodic pattern. The volume of the system may become generally bulky because the size of the display implemented as described above is increased.

Referring to FIG. 7, a beam splitter 720 may be disposed between a light source 710 and a spatial light modulator 730. The beam splitter 720 may make light, modulated and reflected by the spatial light modulator 730, incident on optical elements 740. For example, the beam splitter 720 may split pieces of light incident from the light source 710 and the spatial light modulator 730 into pieces of light having different vibration directions (e.g., having different angles, such as a right angle), and may output some light (i.e., the incident light from the light source) to the spatial light modulator 730 and the remaining light (i.e., incident light from the spatial light modulator) to the optical element 740.

If the beam splitter 720 is used as in FIG. 7, although this is basically the same as the reflection type display, the verticality of the incident direction of light emitted from the light source and the verticality of the direction of a represented 3D image may be differently. If the incident direction of light emitted from the light source and the direction of the represented 3D image are vertical to each other as described above, this may be used to implement a 3D display of a table top form. That is, if a reflection type optical system structure based on a beam splitter is used, a light source is incident in an in-plane direction of a thin table and a 3D image can be implemented out of the plane direction. Accordingly, a 3D display implementation of a table top form may be facilitated.

In accordance with the present invention, a 3D image having a great (i.e., extended) field of view and size compared to a field of view that may be represented by the number of pixels of a spatial light modulator can be formed by modulating light modulated using the spatial light modulator once more using the optical element (i.e., non-periodic optical element) having an irregular array structure. That is, a 3D holographic image having an extended size and field of view within a wide space can be formed by extending both the size and field of view of a 3D image that may be represented by the number of pixels of a single spatial light modulator using the non-periodic optical element.

Furthermore, a formed 3D hologram image may not be limited to the wavelength and type of a wave because the 3D hologram image having a large field of view is formed using the spatial light modulator and the non-periodic optical element.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A three-dimensional (3D) holographic image apparatus, comprising:
   a light source configured to radiate light;
   a spatial light modulator configured to modulate the light projected by the light source; and
   a non-periodic optical element configured to modulate incident light by refracting, diffracting or reflecting a direction of the incident light in a plurality of directions when the light modulated by the spatial light modulator is incident, wherein the optical elements of the non-periodic optical element are physically non-periodically arranged but not randomly arranged, and wherein the non-periodic optical element includes at least one of a pinhole array in which pinholes have been physically arranged in a predefined non-periodical way, and a holographic optical element, and
   wherein a 3D holographic image is formed based on the light modulated by the non-periodic optical element.

2. The 3D holographic image apparatus of claim 1, wherein the formed 3D holographic image comprises a 3D image having a greater space-bandwidth product than a space-bandwidth product corresponding to the number of pixels of the spatial light modulator.

3. The 3D holographic image apparatus of claim 1, further comprising a computation unit configured to compute an incident pattern of the spatial light modulator based on image information of the 3D holographic image to be formed and optical characteristics of the non-periodic optical element.

4. The 3D holographic image apparatus of claim 3, wherein the computation unit computes the incident pattern of the spatial light modulator based on a linear response function algorithm or an iterative algorithm.

5. The 3D holographic image apparatus of claim 3, wherein the spatial light modulator modulates a wave front or pattern of the light projected by the light source so that the light projected by the light source becomes the incident pattern corresponding to the pattern of the spatial light modulator.

6. The 3D holographic image apparatus of claim 5, wherein the non-periodic optical element forms the 3D holographic image having a desired wave front or pattern by transmitting light modulated to have a pattern corresponding to the incident pattern of the spatial light modulator.

7. The 3D holographic image apparatus of claim 1, wherein the non-periodic optical element expands a size and field of view of an image corresponding to the light modulated by the spatial light modulator.

8. The 3D holographic image apparatus of claim 1, wherein the non-periodic optical elements and pixels of the spatial light modulator are configured to correspond to each other in a one-to-one manner.

9. The 3D holographic image apparatus of claim 1, wherein the non-periodic optical element expands a space and a bandwidth represented by the spatial light modulator by increasing an optical mode corresponding to the number of pixels of the spatial light modulator of electromagnetic waves.

10. A three-dimensional (3D) holographic image method, comprising steps of:
   modulating light projected from a light source by a spatial light modulator; and
   making incident the modulated light on a non-periodic optical element and modulating the incident light by refracting, diffracting or reflecting a direction of the incident light in a plurality of directions, wherein the optical elements of the non-periodic optical element are physically non-periodically arranged but not randomly arranged, and wherein the non-periodic optical element comprises at least one of a pinhole array in which pinholes have been arranged in a predefined non-periodical way, and a holographic optical element, and wherein a 3D holographic image is formed based on the light modulated by the non-periodic optical element.

11. The 3D holographic image method of claim 10, wherein the formed 3D holographic image comprises a 3D image having a greater space-bandwidth product than a space-bandwidth product corresponding to the number of pixels of the spatial light modulator.

12. The 3D holographic image method of claim 10, further comprising the step of computing an incident pattern of the spatial light modulator based on image information of the 3D holographic image to be formed and optical characteristics of the non-periodic optical element.

13. The 3D holographic image method of claim 12, wherein the step of computing the incident pattern comprises computing the incident pattern of the spatial light modulator based on a linear response function algorithm or an iterative algorithm.

14. The 3D holographic image method of claim 12, wherein the step of modulating the light projected onto the spatial light modulator comprises modulating a wave front or pattern of the light projected by the light source so that the light projected by the light source becomes the incident pattern of the spatial light modulator.

15. The 3D holographic image method of claim 14, wherein the step of modulating the incident light comprises forming the 3D holographic image having a desired wave front or pattern by transmitting light modulated to have a pattern corresponding to the incident pattern of the spatial light modulator.

16. The 3D holographic image method of claim 10, wherein the step of modulating the incident light comprises modulating the incident light by expanding a size and field of view of an image corresponding to the light modulated by the spatial light modulator.

17. The 3D holographic image method of claim 10, wherein the non-periodic optical elements and pixels of the spatial light modulator are configured to correspond to each other in a one-to-one manner.

18. The 3D holographic image method of claim 10, wherein the step of modulating the incident light comprises modulating the incident light by increasing an optical mode corresponding to a number of pixels of the spatial light modulator of electromagnetic waves so that a space bandwidth represented by the spatial light modulator is expanded.

* * * * *